US012770106B2

(12) United States Patent
Sabo

(10) Patent No.: US 12,770,106 B2
(45) Date of Patent: *Oct. 20, 2026

(54) SYSTEMS AND METHODS FOR GENERATING STATUS REQUESTS FOR UNITS OF WORK

(71) Applicant: Asana, Inc., San Francisco, CA (US)

(72) Inventor: Gregory Louis Sabo, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/817,854

(22) Filed: Aug. 28, 2024

(65) Prior Publication Data

US 2024/0420087 A1 Dec. 19, 2024

Related U.S. Application Data

(63) Continuation of application No. 18/063,344, filed on Dec. 8, 2022, now Pat. No. 12,154,075, which is a continuation of application No. 16/224,374, filed on Dec. 18, 2018, now Pat. No. 11,568,366.

(51) Int. Cl.

| | |
|---|---|
| ***G06Q 10/10*** | (2023.01) |
| ***G06Q 10/0631*** | (2023.01) |
| ***G06Q 10/0633*** | (2023.01) |
| ***H04L 51/046*** | (2022.01) |

(52) U.S. Cl.

CPC ... *G06Q 10/103* (2013.01); *G06Q 10/063114* (2013.01); *G06Q 10/06316* (2013.01); *G06Q 10/0633* (2013.01); *H04L 51/046* (2013.01)

(58) Field of Classification Search

CPC ......... G06Q 10/103; G06Q 10/063114; G06Q 10/06316; G06Q 10/10; H04L 67/54

See application file for complete search history.

(56) References Cited

U.S. PATENT DOCUMENTS

| | | | | |
|---|---|---|---|---|
| 7,386,797 | B1 | 6/2008 | Chatterjee | |
| 8,522,240 | B1 * | 8/2013 | Merwarth | G06Q 10/0631 705/7.41 |
| 8,738,414 | B1 | 5/2014 | Nagar | |
| 11,212,326 | B2 | 12/2021 | Faulkner | |

(Continued)

OTHER PUBLICATIONS

Asana Project Management 2017 Beginner Training Tutorial—How To Use Asana. Aug. 9, 2017. (available at: https://www.youtube.com/watch?v=XgTZT5d_njk). (Last accessed Jan. 16, 2025).*

(Continued)

*Primary Examiner* — Sarah M Monfeldt
*Assistant Examiner* — Donald J Edmonds
(74) *Attorney, Agent, or Firm* — Esplin & Associates, PC

(57) ABSTRACT

Systems and methods for generating status requests for units of work are disclosed. Some implementations may: manage environment state information maintaining a collaboration environment; identify one or more work unit records having potentially incorrect status values for a status parameter; generate status requests prompting user input to update the potentially incorrect status values for the one or more work unit records identified; and effectuate presentation of the status requests, such that the first status request is presented via a client computing platform associated with the first user.

20 Claims, 4 Drawing Sheets

(56) References Cited

U.S. PATENT DOCUMENTS

| | | | |
|---|---|---|---|
| 11,783,253 | B1 | 10/2023 | Pelz |
| 2004/0233235 | A1 | 11/2004 | Rubin |
| 2005/0144232 | A1 | 6/2005 | Estrada |
| 2005/0204297 | A1 | 9/2005 | Banatwala |
| 2005/0216381 | A1 | 9/2005 | Banatwala |
| 2008/0052358 | A1 | 2/2008 | Beaven |
| 2010/0169832 | A1 | 7/2010 | Chang |
| 2011/0069643 | A1 | 3/2011 | Yoakum |
| 2012/0054095 | A1 | 3/2012 | Lesandro |
| 2015/0149173 | A1 | 5/2015 | Korycki |
| 2015/0178666 | A1 | 6/2015 | Green |
| 2016/0352812 | A1 | 12/2016 | Ahlgren |
| 2018/0131649 | A1* | 5/2018 | Ma .......................... H04L 67/54 |
| 2019/0340166 | A1 | 11/2019 | Raman |
| 2020/0293975 | A1 | 9/2020 | Faulkner |
| 2021/0248161 | A1 | 8/2021 | Leston |
| 2023/0061905 | A1 | 3/2023 | Culver |
| 2023/0206152 | A1 | 6/2023 | Nouri |
| 2023/0239261 | A1 | 7/2023 | David |
| 2023/0308409 | A1 | 9/2023 | Rosenstein |
| 2024/0012661 | A1 | 1/2024 | Sabo |
| 2024/0061688 | A1 | 2/2024 | Ben-Elazar |
| 2024/0079112 | A1 | 3/2024 | Miller |
| 2024/0223517 | A1 | 7/2024 | Cameron |
| 2024/0257008 | A1 | 8/2024 | Cheng |
| 2024/0281738 | A1 | 8/2024 | Sabo |
| 2024/0323106 | A1 | 9/2024 | Mann |
| 2024/0346407 | A1 | 10/2024 | Matson |
| 2025/0165927 | A1 | 5/2025 | Sabo |
| 2025/0200143 | A1 | 6/2025 | Varghese |
| 2025/0200474 | A1 | 6/2025 | Sabo |
| 2025/0259072 | A1 | 8/2025 | Wheatley |
| 2025/0379934 | A1 | 12/2025 | Rose |

OTHER PUBLICATIONS

Kroner, M. Schneider and J. Mori, “A Framework for Ubiquitous Content Sharing,” in IEEE Pervasive Computing, vol. 8, No. 4, pp. 58-65, Oct.-Dec. 2009, doi: 10.1109/MPRV.2009.65 (Year: 2009).
Dourish, Paul, and Victoria Bellotti. “Awareness and coordination in shared workspaces.” Proceedings of the 1992 ACM conference on Computer-supported cooperative work. 1992. 9 pages.
Aliev, “Proposal of a monitoring system for collaborative robots to predict outages and to assess reliability factors exploiting machine learning” (Year: 2021).

* cited by examiner

SYSTEMS AND METHODS FOR GENERATING STATUS REQUESTS FOR UNITS OF WORK

FIELD OF THE DISCLOSURE

The present disclosure relates to systems and methods for generating status requests for units of work.

BACKGROUND

Collaboration environments enable users to assign projects, tasks, or other assignments to assignees to complete. Such collaboration environments enable users to work in a more organized and efficient manner. However, upon completion, users often forget to update the projects and/or tasks to indicate they are complete. As such, project and/or task supervisors and managers are left in the dark and unaware of the true status of the project and/or task.

SUMMARY

In typical online collaboration environments for managing workflow, project/team leaders often have to follow-up and/or checked off when individual tasks are completed because assignees often forget to do so. Generating status requests for units of work as described herein help prevent project/team leaders from having to follow-up with individual assignees. Instead, units of work that might need status updates are identified and status requests prompting updates from users are generated and presented to the users. In some implementations, users may be incentivized to provide user input responding to status requests via incentive offers.

One aspect of the present disclosure relates to a system configured for generating status requests for units of work. The system may include one or more hardware processors configured by machine-readable instructions. The processor(s) may be configured to manage environment state information maintaining a collaboration environment. The environment state information may include values of user parameters and values of work unit parameters. The values of the user parameters may be organized in user records corresponding to users interacting with and viewing the collaboration environment and the values of the work unit parameters are organized in work unit records corresponding to units of work managed, created, and/or assigned within the collaboration environment. Managing the environment state information may include updating the values of the work unit parameters responsive to user interactions with the units of work. The values of the work unit parameters for first unit of work may be updated responsive to one or more users interacting with the first unit of work.

The processor(s) may be configured to identify one or more work unit records having potentially incorrect status values for a status parameter. The one or more work unit records having potentially incorrect status values may be identified based on the values of the work unit parameters such that a first work unit record having a potentially incorrect first status value is identified based on first values for the work unit parameters associated with the first unit of work. The processor(s) may be configured to generate status requests prompting user input to update the potentially incorrect status values for the one or more work unit records identified. The status requests may include a first status request prompting user input from a first user associated with the first unit of work to update the potentially incorrect first status value. The processor(s) may be configured to effectuate presentation of the status requests, such that the first status request is presented via a client computing platform associated with the first user.

In some implementations, a system configured for generating status requests for units of work, may include one or more of: one or more servers, one or more client computing platforms, and/or other components. The one or more servers may be configured to communicate with one or more client computing platforms according to a client/server architecture and/or other architecture. The one or more servers and/or client computing platforms may include one or more physical processors configured to execute one or more computer program components. The computer program components may include one or more of an environment state component, an identification component, a status request component, a presentation component, a status update component, an incentive component, and/or other instruction components.

The environment state component may be configured to manage environment state information maintaining a collaboration environment. The environment state information may include values of user parameters, values of work unit parameters, and/or values of other parameters. The values of the user parameters may be organized in user records corresponding to users interacting with and/or viewing the collaboration environment. The values of the work unit parameters may be organized in work unit records corresponding to units of work managed, created, and/or assigned within the collaboration environment. Managing the environment state information may include updating the values of the work unit parameters. The values of the work unit parameters may be updated responsive to user interactions with the units of work. For example, the values of the work unit parameters for first unit of work may be updated responsive to one or more users interacting with the first unit of work. In some implementations, interacting with the first unit of work may include working on the first unit of work, uploading a file associated with the first unit of work, moving on to another unit of work, not working on the unit of work (e.g., the unit of work being idle for a given period of time), the user viewing and/or clicking on the unit of work, and/or other interactions associated with the unit of work.

The identification component may be configured to identify one or more work unit records having potentially incorrect status values for a status parameter. A work unit record may have a potentially incorrect status value for a status parameter if, for example, the status of the associated work unit has not likely been updated and/or likely needs to be updated. The one or more work unit records having potentially incorrect status values may be identified based on the values of the work unit parameters. For example, a first work unit record having a potentially incorrect first status value may be identified based on first values for the work unit parameters associated with the first unit of work. In some implementations, the first work unit record may be identified based on the values for the work unit parameters associated with other units of work.

The status request component may be configured to generate status requests prompting user input to update the potentially incorrect status values for the one or more work unit records identified. The status requests may include, for example, a first status request prompting user input from a first user associated with the first unit of work to update the potentially incorrect first status value. In some implementations, the status requests may be automatically generated responsive to the environment state component updating the values of the work unit parameters. In some implementations, a second user may request a status update such that the first status request may be generated responsive to receiving an update request from a client computing platform associated with a second user.

The presentation component may be configured to effectuate presentation of the status requests. For example, the first status request may be presented within a graphical user interface presented via a client computing platform associated with the first user.

The status update component may be configured to update the status of the first unit of work. The status of the first unit of work may be updated responsive to receiving user input. In some implementations, for example, the user input may include approval of the first suggested status update, an indication of a status update for the first unit of work, and/or other user input. In some implementations, status of the component may be configured to determine a first suggested status update for the first status request based on the first values for the work unit parameters associated with the first unit of work. The first suggested status update may be included in the first status request. As such, for example, presentation component may be configured to effectuate presentation of the first suggested status update with the first status request.

In some implementations, the incentive component may configured to generate an incentive offer. The incentive offer may indicate an incentive for the first user based on the first values for the work unit parameters associated with the first unit of work. The presentation component may configured to effectuate presentation of the incentive offer to the first user via the first client computing platform. The incentive component may be configured to provide the incentive to the first user responsive to receiving the user input responsive to the first status request from the first user. As such, for example, the user may receive an incentive for updating the status associated with the first unit of work and/or responding to the first status request for the first unit of work.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
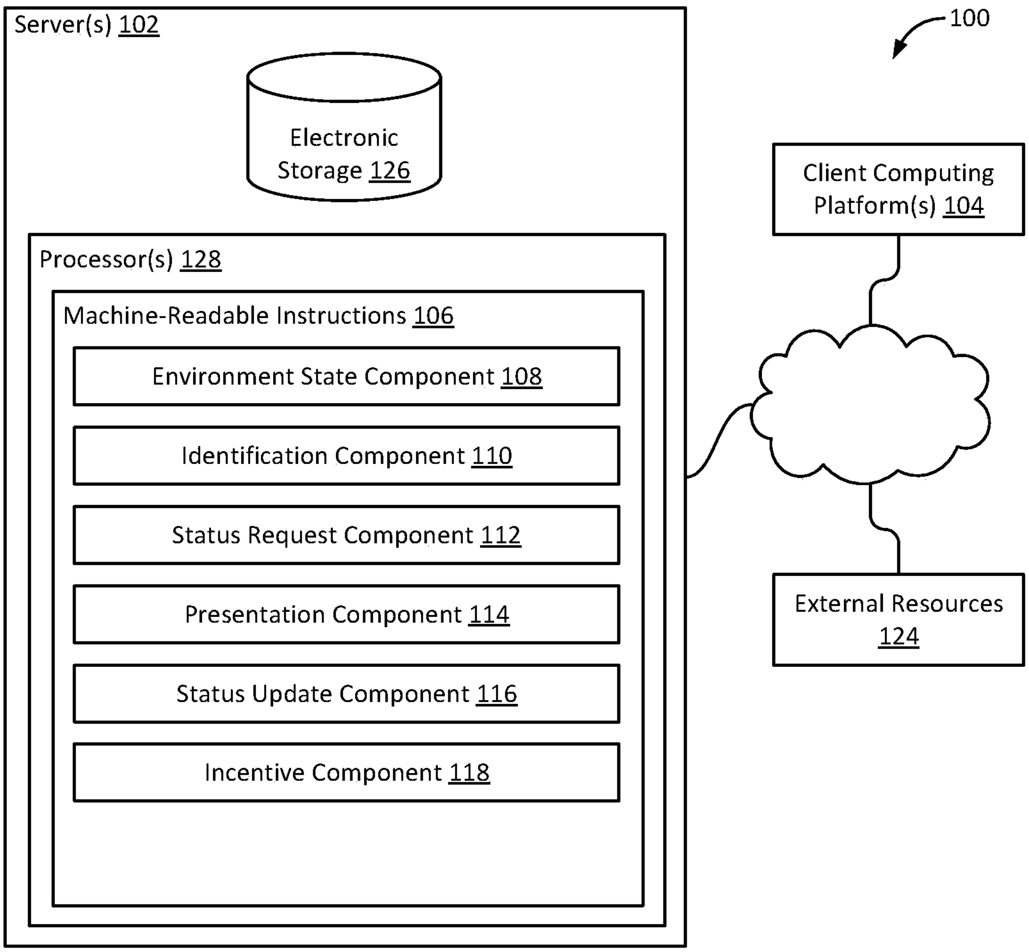
FIG. 1 shows a system configured for generating status requests for units of work, in accordance with one or more implementations.

FIG. 1 illustrates a system 100 configured for generating status requests for units of work, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of an environment state component 108, an identification component 110, a status request component 112, a presentation component 114, a status update component 116, an incentive component 118, and/or other instruction components.

Environment state component 108 may be configured to manage environment state information maintaining a collaboration environment. The environment state information may include values of user parameters and values of work unit parameters. By way of non-limiting example, the values of the user parameters may be organized in user records corresponding to users interacting with and viewing the collaboration environment. The values of the work unit parameters may be organized in work unit records corresponding to units of work managed, created, and/or assigned within the collaboration environment. A given work unit may have one or more assignees and/or team members working on the given work unit. Work units may include one or more to-do items, action items, objectives, and/or other units of work one or more users should accomplish and/or plan on accomplishing. Units of work may be created by a given user for the given user and/or created by the given user and assigned to one or more other users. A given unit of work may include one or more projects, tasks, sub-tasks, and/or other units of work possibly assigned to and/or associated with one or more users.

The work unit parameters may, by way of non-limiting example, include one or more of: one or more units of work, one or more user comment parameters (e.g., a creator, a recipient, one or more followers, one or more other interested parties, content, one or more times, up-votes, other hard-coded responses, etc.), a unit of work name, a unit of work description, one or more unit of work dates (e.g., a start date, a due date, a completion date, and/or other unit of work dates), one or more members associated with a unit of work (e.g., an owner, one or more other project/task members, member access information, and/or other unit of work members and/or member information), a status parameter (e.g., an update, a hardcoded status update, a completed/ uncomplete/mark complete, a measured status, a progress indication, quantity of sub-work units remaining for a given unit of work, completed work units in a given project, and/or other status parameter), one or more interaction parameters (e.g., indicating a given unit of work is being worked on/was worked on, given work unit of work was viewed, a given unit of work was selected, how long the given unit of work has been idle, a last interaction parameter indicating when and what user last interacted with the given unit of work, users that interacted with the given unit of work, and/or otherer interaction parameters indicating sources of the interactions, context of the interactions, content of the interactions and/or time for the interactions), one or more file attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, sub-tasks within a task, etc.,), state of a workspace for a given unit of work (e.g., application state parameters, application status, application interactions, user information, and/or other parameters related to the state of the workspace for a unit of work), dependencies between one or more work units, one or more custom fields (e.g., priority, cost, stage, and/or other custom fields), other work unit parameters for the given work units, and/or other work unit parameters, and/or user parameters for one or more users and/or work units the given project is associated with.

The user parameters associated with the users interacting with and/or viewing the collaboration environment may include parameters describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The user parameters may, by way of non-limiting example, include one or more of: a user name, a group parameter, a subset parameter, a user account, a user role, a user department, descriptive user content, a to-email, a from-email, a photo, an organization, a workspace, one or more projects (which may include project parameters defined by one or more work unit records), one or more items of work (which may include one or more unit of work parameters defined by one or more unit of work records), one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, etc.), one or more notification settings, one or more progress parameters, status information for one or more work units the user is associated with, one or more statistics related to a given user (e.g., how many units of work the user has completed, how quickly the user completed the units of work, how quickly the user completes certain types of work units, the efficiency of the user, bandwidth of the user, activity level of the user, etc.), application access information (e.g., username/password for one or more third-party applications), one or more favorites and/or priorities, workload information, schedule information, historical information, other user parameters for the given user, and/or other user parameters and/or work unit parameters, for one or more work units the given user is associated with.

The environment state component 108 may be configured to update the values of the work unit parameters and/or the user parameters. Managing the environment state information may include updating the values of the work unit parameters. The values of the work unit parameters may be updated responsive to user interactions with the units of work. Responsive to a user interacting with a given unit of work, the value of the work unit parameters for the given unit of work may be updated. For example, the values of the work unit parameters for first unit of work may be updated responsive to one or more users interacting with the first unit of work. Interacting with the first unit of work may include one or more of working on the first unit of work, uploading a file associated with the first unit of work, moving on to another unit of work, not working on the unit of work (e.g., the unit of work being idle for a given period of time), the user viewing and/or clicking on the unit of work, and/or other interactions associated with the unit of work.

Identification component 110 may be configured to identify one or more work unit records having potentially incorrect status values for a status parameter. An incorrect status value for status parameter may include a status value that has not been updated and/or a status value that does not accurately reflect the status of the unit of work. The one or more work unit records having potentially incorrect status values may be identified based on the values of the work unit parameters. For example, the first work unit record is identified as having a potentially incorrect status value. A first work unit record having a potentially incorrect first status value may be identified based on first values for the work unit parameters associated with the first unit of work. In some implementations, the first work unit record may be identified as having a potentially incorrect first status value based on the values for the work unit parameters associated with other units of work.

In some implementations, the values of the work unit parameters indicating that the first work unit record may have a potentially incorrect first status value may include a value for a file upload parameter. When users complete units of work or are close to completing units of work, they may upload one or more files associated with the units of work. As such, uploading a file may indicate the status value for the status parameter for the unit of work may be incorrect. Responsive to a user uploading a file associated with a given unit of work, state component 108 may be configured to update the file upload parameter for the given unit of work. Identification component 110 may be configured to identify the work unit record with the newly updated file upload parameter as a work unit record having a potentially incorrect status value.

In some implementations, the values of the work unit parameters indicating that the first work unit record may have a potentially incorrect first status value may include a value for a last interaction parameter corresponding to the first unit of work and/or a second unit of work. The values of a last interaction parameter for multiple units of work may be used to identify when a given user moves on to another unit of work from a first unit of work possibly indicating the first unit of work is actually complete. By way of non-limiting example, responsive to the value for a last interaction parameter corresponding to the first unit of work indicating the first user last interacted with the first unit of work before the value for the him last interaction parameter corresponding to the second unit of work indicates the first user last interacted with the second unit of work, identification component 110 may identify the first work unit record as having a potentially incorrect status value for a status parameter.

In some implementations, the values of the work unit parameters indicating that the first work unit record may have a potentially incorrect first status value may include parameter values for one or more interaction parameters. The interaction parameters may include, for example a last interaction parameter, an idle parameter (e.g., indicating a period of time and/or frequency the unit of work is idle and/or not being worked on by a user and/or a given user), an interaction level parameter (e.g., indicating the type of interaction and/or interaction level with the given unit of work, the frequency of interactions, and/or other levels of interaction), and/or other interaction parameters.

Status request component 112 may be configured to generate status requests prompting user input to update the potentially incorrect status values for the one or more work unit records identified. In some implementations, the status requests may be automatically generated by status request component 112. Status request component 112 may automatically generate the status requests for given units of work responsive to environment state component 108 updating the values of the work unit parameters associated with the given units of work. In some implementations, status requests may be initiated and/or triggered by another user (e.g., a manager, a project manager, a supervisor, assigning user, and/or other user). Status requests may include notifications and/or prompts for user input used to update the statuses the associated units of work. The user input may include a response to the status request indicating selection of the correct status for a given unit of work, approval of a suggested status update, and/or other user input.

For example, the status requests may include a first status request prompting user input from a first user associated with the first unit of work to update the potentially incorrect first status value. The first status request may be generated automatically and/or responsive to receiving an update request from a client computing platform associated with a second user. The user input may include approval of the first suggested status update and/or an indication of a status update for the first unit of work. The user input may include selection of a first status update for the first unit of work.

Presentation component 114 may be configured to effectuate presentation of the status requests. Status requests may be presented via graphical user interface displaying one or more client computing platforms associated with the users. In some implementations, presentation of the status requests may include presentation of one or more suggested status updates, options for user input (e.g., options for selection of the correct status and/or approval/denial of the correct status for a given unit of work) and/or other information and/or options. The first status request may be presented via a client computing platform associated with the first user.

Status update component 116 may be configured to update the status of one or more units of work responsive to receiving user input in response to the status requests. For example, status update component 116 may be configured to update the first status value for the first unit of work within the first work unit record.

In some implementations, status update component 116 may be configured to determine one or more suggested status updates for a given unit of work. The suggested status updates may include proposed status updates and/or options for a status update from which the user can select. For example, status update component 116 may be configured to determine a first suggested status update for the first status request based on the first values for the work unit parameters associated with the first unit of work. The first suggested status update may be included in the first status request.

In some implementations, incentive component 118 may be configured to generate incentive offers for users for updating and/or responding to status requests. The incentive offers may be determined based on the values for the work unit parameters associated with the given units of work. By way of non-limiting example, incentives for status requests associated with units of work that have been pending for a long time, involve a lot of users, are associated with higher level users (e.g., managers, project leads, team leaders, supervisors, etc.), and/or other characteristics indicating higher value and/or importance may have more value than incentive for status requests associated with units of work that have only been pending for short period of time, involve a single user, are associated with lower level users, and/or other characteristics indicating lower value and/or importance. Incentive component 118 may be configured to generate an incentive offer indicating an incentive for the first user based on the first values for the work unit parameters associated with the first unit of work.

Incentive component 118 may be configured to provide the incentive to one or more users responsive to receiving user input from the one or more users in response to the given status requests. In some implementations, incentive component 118 may be configured to provide the incentive to the first user responsive to receiving the user input in response to the first status request from the first user. The incentive may include an amount of consideration having some value within and/or external to the collaboration environment.

Returning to presentation component 114, presentation component 114 may be configured to effectuate presentation of one or more incentive offers for updating and/or provide a user input in response to the status update requests. As such, for example, presentation component 114 may be configured to effectuate presentation of an incentive offer to the first user via the first client computing platform.

Figure 2:
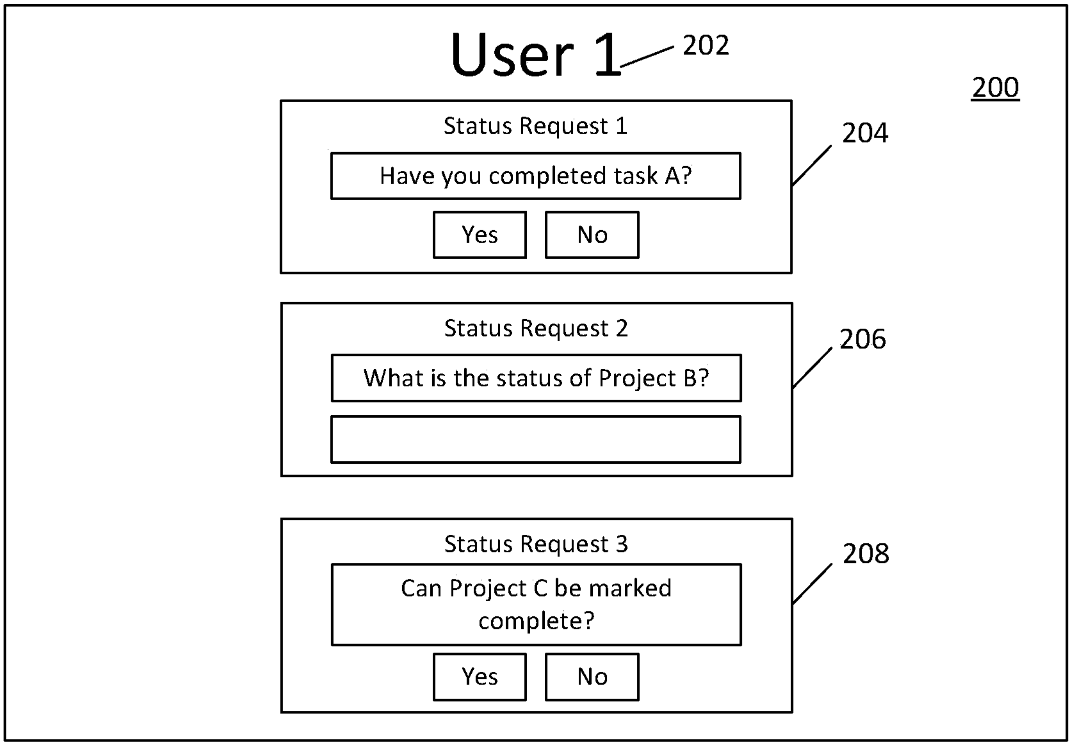
FIG. 2 illustrates an example graphical user interface presenting multiple status requests, in accordance with one or more implementations.

FIG. 2 illustrates an example graphical user interface presenting multiple status requests, in accordance with one or more implementations. Graphical user interface 200 may be configured to effectuate presentation of status request 1 204, status request 2 206, and/or status request 3 208. Status request 1 204 may include "yes" and "no" options for user input in response to status request 1 204. Status request 2 206 may include a text box for receiving user input in response to status request 2 2-6. Status request 3 208 may include a suggested status update (e.g., marking Project C complete) and request the user to improve and/or deny the suggested status update.

Figure 3:
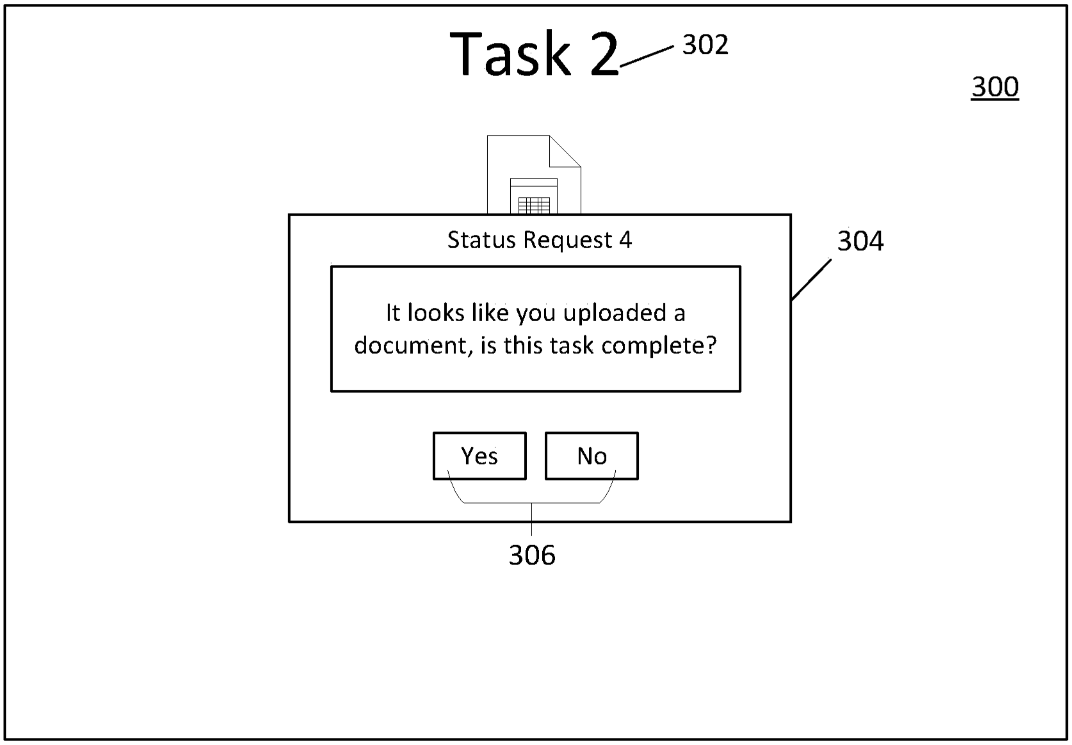
FIG. 3 illustrates an example graphical user interface presenting a status request, in accordance with one or more implementations.

FIG. 3 illustrates an example graphical user interface presenting a status request, in accordance with one or more implementations. Graphical user interface 300 may be configured to effectuate presentation of status request 4 304 associated with task 2 302. Status request 4 304 may be generated responsive to the values of the work unit parameters associated with task 2 indicating the work unit record associated with task 2 may have a potentially incorrect status value because the file upload parameter for tasks 2 was updated. Status request 4 304 may include "yes" and "no" options 306 for user input in response to status request 4 304.

Figure 4:
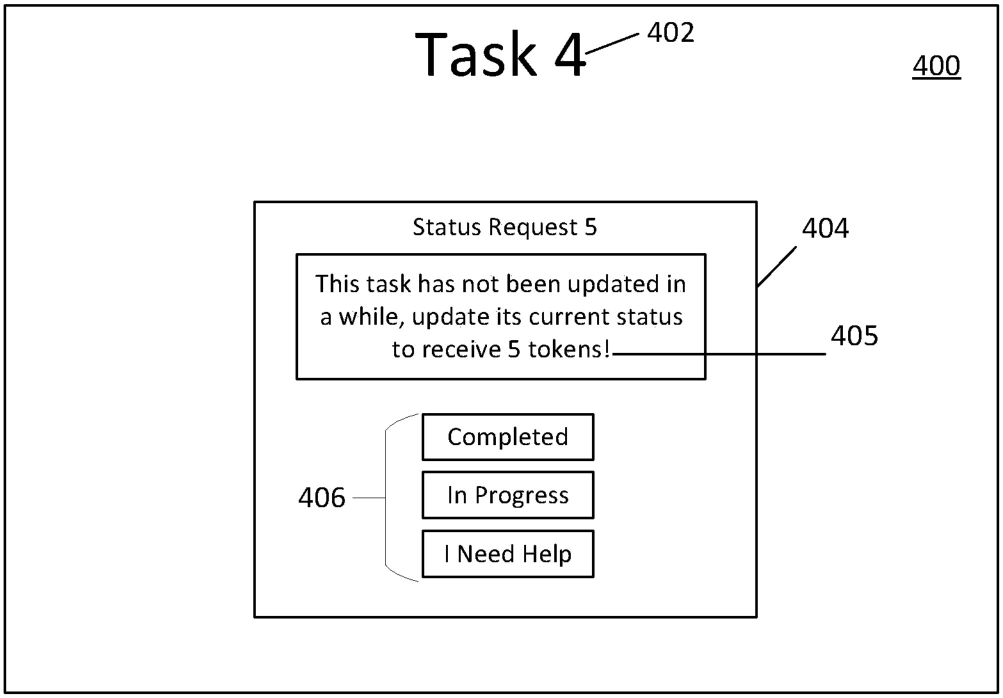
FIG. 4 illustrates an example graphical user interface presenting a status request and an incentive offer, in accordance with one or more implementations.

FIG. 4 illustrates an example graphical user interface presenting a status request, in accordance with one or more implementations. Graphical user interface 400 may be configured to effectuate presentation of status request 5 404 associated with task 4 402. Status request 5 404 may include an incentive offer 405 incentivizing the user to update the task to receive the incentive (e.g., 5 tokens). Responsive to the user selecting one of the input options 406 (e.g., "completed", "in progress", and/or "I need help"), the incentive (e.g., 5 tokens) may be provided to the user. The status for task 4 402 may be updated responsive to and/or based on the user selection of one of the input options (e.g., "completed", "in progress", and/or "I need help").

Figure 5:
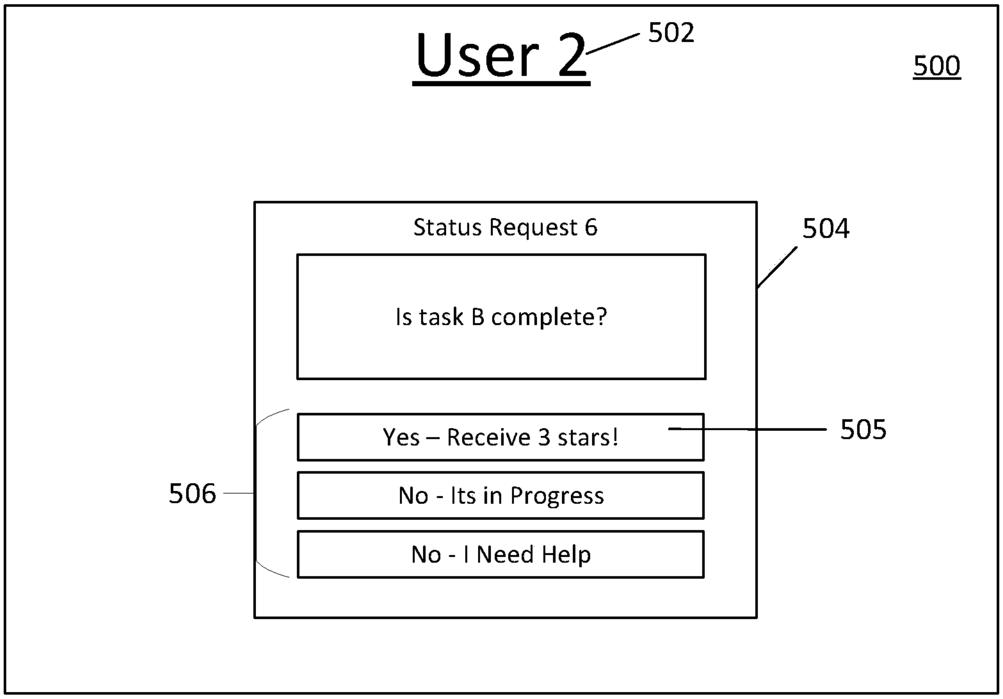
FIG. 5 illustrates an example graphical user interface presenting a status request and an incentive offer, in accordance with one or more implementations.

FIG. 5 illustrates an example graphical user interface presenting a status request, in accordance with one or more implementations. Graphical user interface 500 may be configured to effectuate presentation of status request 6 504. Status request 6 504 may include an incentive offer 505 incentivizing the user if task B is complete and the user selections the update option indicating task B is complete. update the task to receive the incentive (e.g., 5 tokens). Responsive to the user selecting one of the input options 506 (e.g., "Yes", "No—It's in progress", and/or "No—I need help"), the incentive (e.g., 3 stars) may be provided to the user. The status for task 6 may be updated responsive to and/or based on the user selection of one of the input options (e.g., "Yes", "No—It's in progress", and/or "No—I need help").

Returning to FIG. 1, in some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 108, 110, 112, 114, 116, 118, 120, and/or 122, and/or other components. Processor(s) 128 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 128 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 128 may be configured to execute one or more additional components that may perform some or all of the functionality attributed below to one of components 108, 110, 112, 114, 116, 118, 120, and/or 122.

Figure 6:
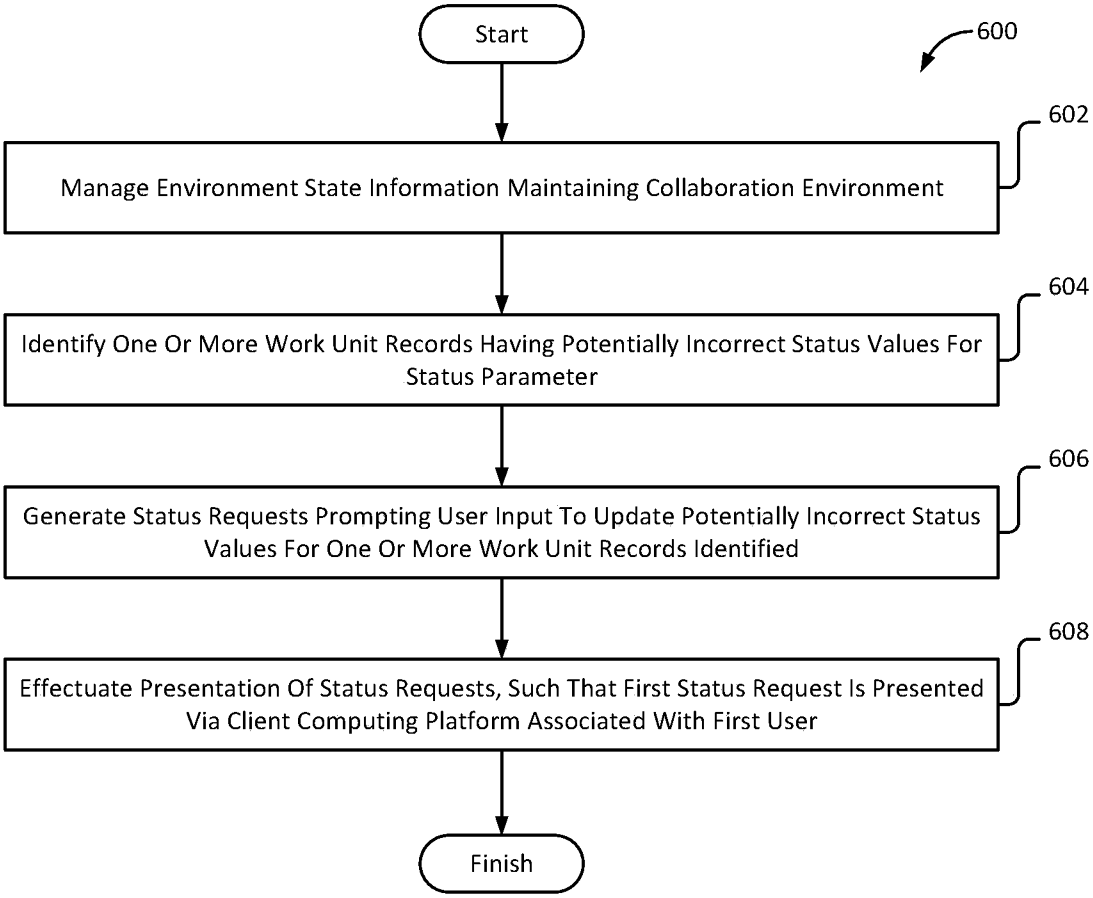
FIG. 6 illustrates a flow chart of a method for generating status requests for units of work, in accordance with one or more implementations.

FIG. 6 illustrates a method 600 for generating status requests for units of work, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

An operation 602 may include managing environment state information maintaining a collaboration environment. The environment state information may include values of user parameters and values of work unit parameters. The values of the user parameters may be organized in user records corresponding to users interacting with and viewing the collaboration environment and the values of the work unit parameters are organized in work unit records corresponding to units of work managed, created, and/or assigned within the collaboration environment. Managing the environment state information may include updating the values of the work unit parameters responsive to user interactions with the units of work. The values of the work unit parameters for first unit of work may be updated responsive to one or more users interacting with the first unit of work. Operation 602 may be performed by one or more hardware processors configured by machine-readable instructions including a component that is the same as or similar to environment state component 108, in accordance with one or more implementations.

An operation 604 may include identifying one or more work unit records having potentially incorrect status values for a status parameter. The one or more work unit records having potentially incorrect status values may be identified based on the values of the work unit parameters such that a first work unit record having a potentially incorrect first status value is identified based on first values for the work unit parameters associated with the first unit of work. Operation 604 may be performed by one or more hardware processors configured by machine-readable instructions including a component that is the same as or similar to identification component 110, in accordance with one or more implementations.

An operation 606 may include generating status requests prompting user input to update the potentially incorrect status values for the one or more work unit records identified. The status requests may include a first status request prompting user input from a first user associated with the first unit of work to update the potentially incorrect first status value. Operation 606 may be performed by one or more hardware processors configured by machine-readable instructions including a component that is the same as or similar to status request component 112, in accordance with one or more implementations.

An operation 608 may include effectuating presentation of the status requests, such that the first status request is presented via a client computing platform associated with the first user. Operation 608 may be performed by one or more hardware processors configured by machine-readable instructions including a component that is the same as or similar to presentation component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to update a potentially incorrect status value, the system comprising:

one or more hardware processors configured by machine-readable instructions to:

manage, by a server, environment state information maintaining a virtual collaboration environment, the virtual collaboration environment being configured to facilitate interaction by users with the virtual collaboration environment through instances of a graphical user interface, the environment state information including a work unit record corresponding to a unit of work managed, created, and/or assigned within the virtual collaboration environment;

update, by the server, the work unit record based on the interaction by the users with the virtual collaboration environment;

identify, by the server and based on the update to the work unit record, the work unit record has a potentially incorrect status value for a status parameter, wherein a status value characterizes status of the unit of work, wherein the work unit record is identified as having the potentially incorrect status value because the status value for the work unit record does not reflect the interaction by the users with the virtual collaboration environment which caused the work unit record to be updated;

generate, by the server, a status request prompting user input to update the potentially incorrect status value;

establish a network connection between a remotely located client computing platform associated with a user and the server;

effectuate communication of information from the server to the remotely located client computing platform over the network connection to cause the remotely located client computing platform to present the status request, the status request including a user-selectable element corresponding to an update to the potentially incorrect status value;

obtain, by the server, user input information conveying the user input to update the potentially incorrect status value; and update, by the server, the potentially incorrect status value based on the user input information, such that responsive to the user input including selection of the user-selectable element, the potentially incorrect status value is updated to an updated status value.

2. The system of claim 1, wherein the interactions by the users that lead to the update of the work unit record include working on the unit of work or an other unit of work, and/or uploading individual files to the work unit record.

3. The system of claim 1, wherein the work unit record is identified as having the potentially incorrect status value based on information included in one or more other work unit records.

4. The system of claim 1, wherein the status request is generated automatically in response to updating the work unit record.

5. The system of claim 1, wherein the status request is generated responsive to receiving an update request.

6. The system of claim 1, wherein the one or more hardware processors are further configured by the machine-readable instructions to:

determine a suggested status update for the status request.

7. The system of claim 6, wherein the selection of the user-selectable element conveys approval of the suggested status update.

8. The system of claim 1, wherein the one or more hardware processors are further configured by the machine-readable instructions to generate an incentive offer indicating an incentive to provide the user input to update the potentially incorrect status value.

9. The system of claim 8, wherein the one or more hardware processors are further configured by the machine-readable instructions to:

effectuate presentation of the incentive offer; and provide the incentive.

10. The system of claim 1, wherein the one or more hardware processors are further configured by the machine-readable instructions to:

responsive to the user input including selection of an other user-selectable element, update the potentially incorrect status value to an other updated status value.

11. A computer-implemented method to update a potentially incorrect status value, the method comprising:

managing, by a server, environment state information maintaining a virtual collaboration environment, the virtual collaboration environment being configured to facilitate interaction by users with the virtual collaboration environment through instances of a graphical user interface, the environment state information including a work unit record corresponding to a unit of work managed, created, and/or assigned within the virtual collaboration environment;

updating, by the server, the work unit record based on the interaction by the users with the virtual collaboration environment;

identifying, by the server and based on the updating of the work unit record, the work unit record has a potentially incorrect status value for a status parameter, wherein a status value characterizes status of the unit of work, wherein the work unit record is identified as having the potentially incorrect status value because the status value for the work unit record does not reflect the interaction by the users with the virtual collaboration environment which caused the work unit record to be updated;

generating, by the server, a status request prompting user input to update the potentially incorrect status value;

establishing a network connection between a remotely located client computing platform associated with a user and the server;

effectuating communication of information from the server to the remotely located client computing platform over the network connection to cause the remotely located client computing platform to present the status request, the status request including a user-selectable element corresponding to an update to the potentially incorrect status value;

obtaining, by the server, user input information conveying the user input to update the potentially incorrect status value; and updating, by the server, the potentially incorrect status value based on the user input information, including responsive to the user input including selection of the user-selectable element, the potentially incorrect status value is updated to an updated status value.

12. The method of claim 11, wherein the interactions by the users that lead to the updating of the work unit record include working on the unit of work or an other unit of work, and/or uploading individual files to the work unit record.

13. The method of claim 11, wherein the work unit record is identified as having the potentially incorrect status value based on information included in one or more other work unit records.

14. The method of claim 11, wherein the status request is generated automatically in response to the updating of the work unit record.

15. The method of claim 11, wherein the status request is generated responsive to receiving an update request.

16. The method of claim 11, further comprising:

determining a suggested status update for the status request.

17. The method of claim 16, wherein the selection of the user-selectable element conveys approval of the suggested status update.

18. The method of claim 11, further comprising:

generating an incentive offer indicating an incentive to provide the user input to update the potentially incorrect status value.

19. The method of claim 18, further comprising:

effectuating presentation of the incentive offer; and providing the incentive.

20. The method of claim 11, further comprising:

responsive to the user input including selection of an other user-selectable element, updating the potentially incorrect status value to an other updated status value.

* * * * *